Figure 1:
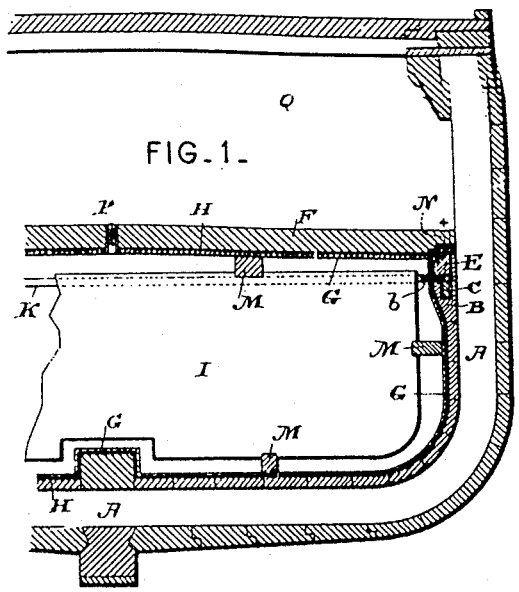

(No Model.) 4 Sheets—Sheet 1.

L. H. ROGERS.
SECONDARY BATTERY AND MEANS FOR TRANSPORTING THE SAME.

No. 310,724. Patented Jan. 13, 1885.

ATTEST.
Geo. T. Smallwood.
J. Henry Kaiser.

INVENTOR.
Lebbeus H. Rogers
by A. Pollok his atty

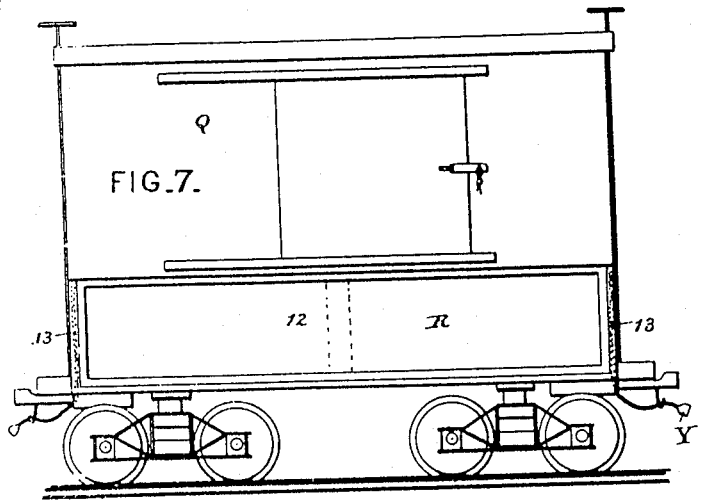
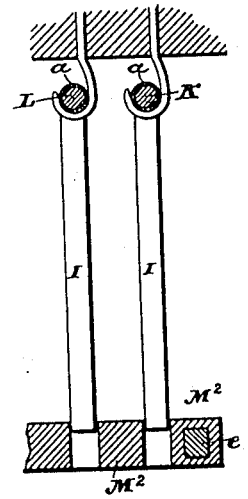
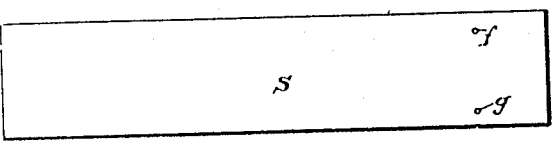
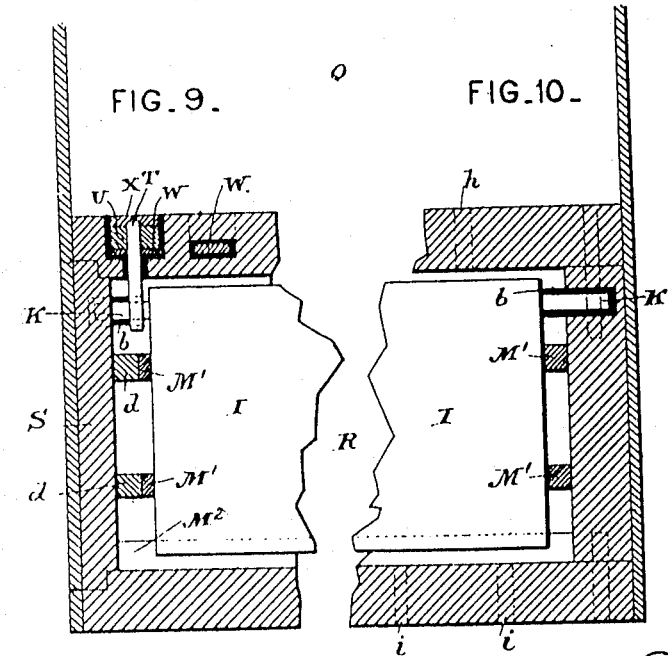
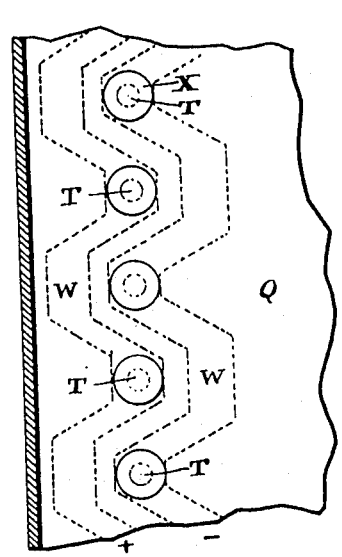

(No Model.) 4 Sheets—Sheet 3.
L. H. ROGERS.
SECONDARY BATTERY AND MEANS FOR TRANSPORTING THE SAME.
No. 310,724. Patented Jan. 13, 1885.
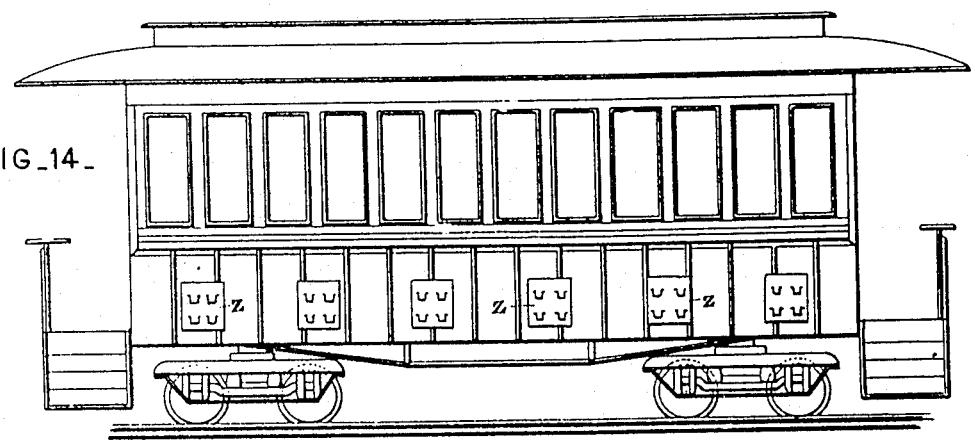
FIG. 14.
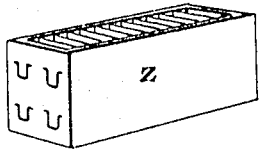
FIG. 13.
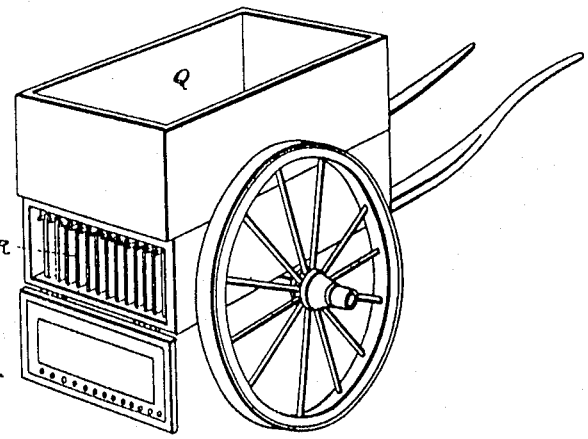
FIG. 15.
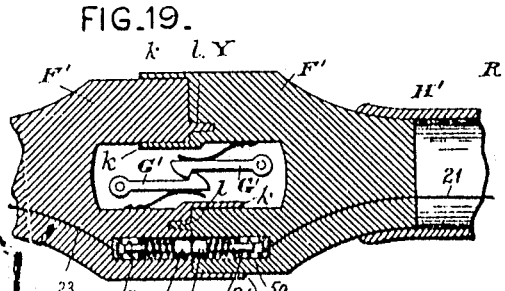
FIG. 19.
FIG. 16.
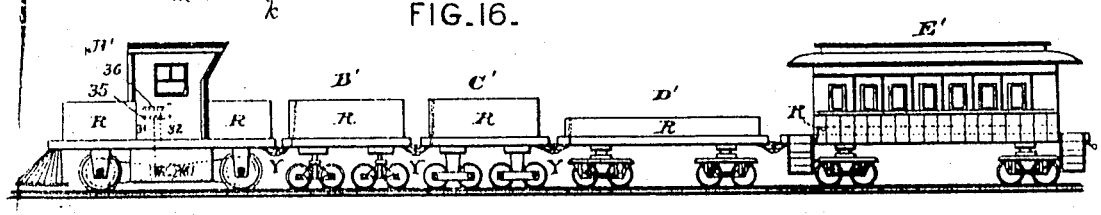
FIG. 17. FIG. 18.
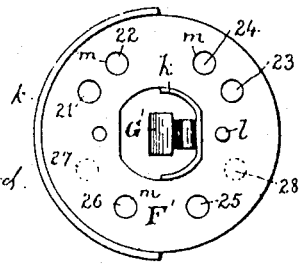
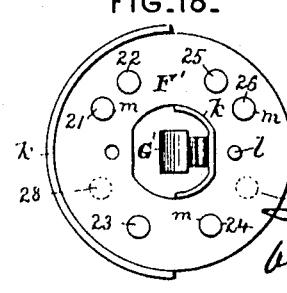
ATTEST.
Geo. T. Smallwood.
J. Henry Kaiser.
INVENTOR.
Lebbeus H. Rogers,
by A. Pollok
his attorney (No Model.) 4 Sheets—Sheet 4.

L. H. ROGERS.
SECONDARY BATTERY AND MEANS FOR TRANSPORTING THE SAME.

No. 310,724. Patented Jan. 13, 1885.

ATTEST.
Geo. T. Smallwood.
J. Henry Kaiser.

INVENTOR.
Lebbeus H. Rogers by
A. Pollok his attorney

UNITED STATES PATENT OFFICE.

LEBBEUS H. ROGERS, OF NEW YORK, N. Y.

SECONDARY BATTERY AND MEANS FOR TRANSPORTING THE SAME.

SPECIFICATION forming part of Letters Patent No. 310,724, dated January 13, 1885.

Application filed October 26, 1883. (No model.)

*To all whom it may concern:*

Be it known that I, LEBBEUS H. ROGERS, of New York city, in the county and State of New York, have invented a new and useful Improvement in Secondary Galvanic Batteries and Means for Transporting the Same, which improvement is fully set forth in the following specification.

The main object of this invention is the transfer of power from one point to another, so as to enable the power of natural sources—such as strong winds, tides, water-falls, and the like—to be utilized at distant places; but it may be used, at least in part, for other purposes.

Heretofore it has been proposed to convert the energy of water-falls and like sources into electricity, and to conduct this electricity over wires to translating devices at distant points; but this system is objectionable for long distances, on account of the large and consequently expensive conductors which would have to be employed.

The present invention contemplates the charging of storage-batteries or electric accumulators of any ordinary or suitable construction and the transportation of the charged cells to the places where the power is to be utilized; and it consists in building cells of storage-batteries into vehicles of all kinds for land or water transportation—such as carts, wagons, railroad-cars, canal-boats, barges, river-boats, ships, and the like—so that the frames of the vehicles constitute, in whole or in part, the containing-vessels of the batteries. The vehicles may be adapted for use solely as conveyers of electrical energy; but, owing to the weight of the battery-plates, electrodes, or elements, it is preferred to make the lower part into a battery, and provide in addition accommodations for freight or passengers.

The invention further comprises certain special constructions, arrangements, and combinations of parts, hereinafter set forth.

The following description will enable those skilled in the art to which the invention appertains or is most nearly related to make and use the same, reference being had to the accompanying drawings, which form a part of this specification.

Figure 2:
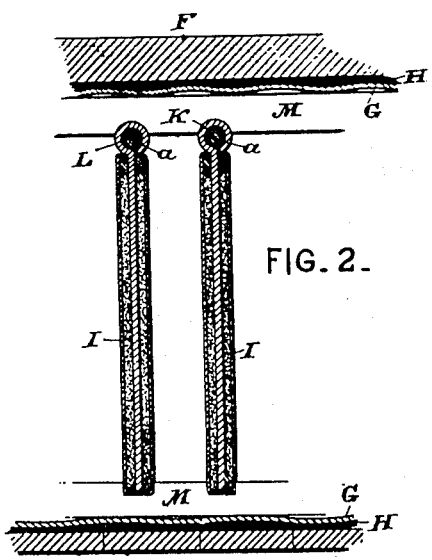
Figure 4:
Figure 3:
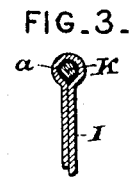
Figure 5:
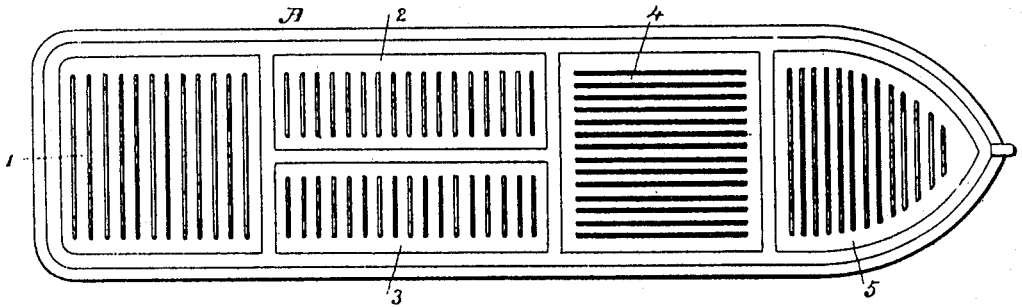
Figure 6:
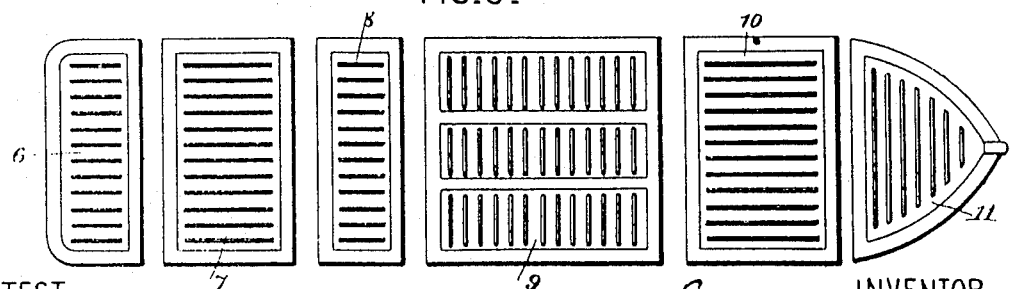
Figure 20:
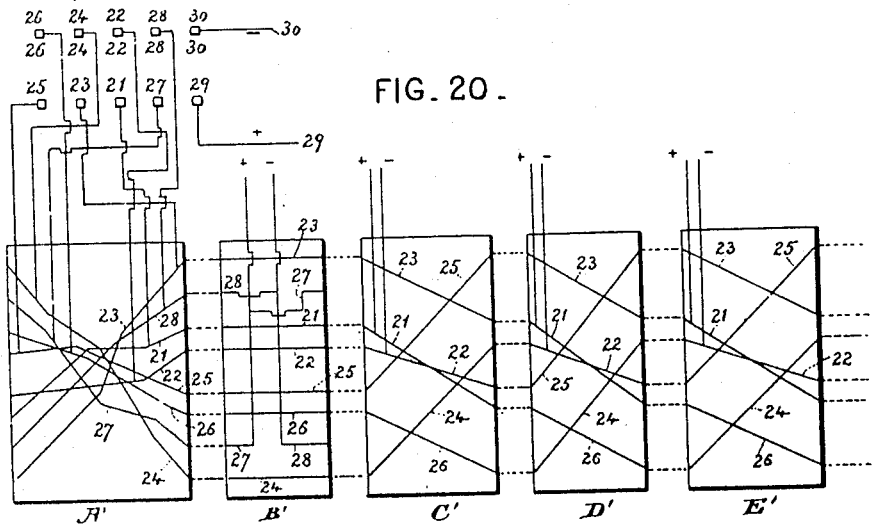

Figure 1 is a vertical cross-section (partial) of a vessel or barge having the lower part formed into a secondary battery, and Figs. 2, 3, and 4, detail views. Figs. 5 and 6 are diagrams showing division of a vessel into compartments and sections. Figs. 7, 8, 9, 10, 11, and 12 are views illustrating a combined railroad-car and secondary battery. Fig. 13 is a view of a secondary battery in the form of a drawer, and Fig. 14 a view of a passenger-car having a series of such batteries under the seats. Fig. 15 is a view of a cart or two-wheeled wagon combined with a secondary battery. Fig. 16 is a view of an electrical railroad-train run by secondary batteries. Figs. 17, 18, and 19 are detail views of the electric couplings; Fig. 20, a diagram of the conductors of a train, and Figs. 21 and 22 respectively a plan and sectional elevation of the switch. Fig. 23 is a plan of another form of switch, and Fig. 24 a bottom view of a car showing another mode of arranging the conductors.

Referring to Fig. 1, A is the frame of the vessel, composed of an outer planking, ribs, and inner planking. B is a wooden beam, which is secured lengthwise of the frame on each side thereof at the proper distance above the bottom, according to the depth which the secondary battery is to have. A metal bar, C, is set in a groove in each of these beams. On the beams are wooden strips E. A cover, F, rests at the edges upon the strips E and beams B and closes the hold. This hold is lined with corrugated or crimped sheet-lead G, the corrugations or crimping preferably being slight and extending widthwise of the vessel, and the lining is separated from the inclosing-walls by a packing, H, of waterproofed felt, or of mineral fiber—such as mineral wool or asbestus—or other suitable material. The lead lining is in two parts, one attached to the frame of the vessel and the other to the cover, or rather to the several parts into which the cover, for convenience in lifting, is divided. Both lining and packing extend into the space between the cover and the ledges on which it rests. The electrodes or battery plates or elements I of the cell are placed in said hold. They may be of any ordinary or suitable construction. As shown, they comprise each a lead plate coated with red lead or other suitable active material and enveloped with felt, which is secured to the plates by riveting or stitching. In Fig. 2 the foundation-plate is of one thickness, in Fig. 3 of double thickness.

The plates are each connected with a cross-bar, K or L, of iron or steel or other suitable material, which at the ends rests upon the bars C. The middle part of the rod where it is in contact with the foundation-plate of the electrode is coated with lead, as at $a$, Figs. 2 and 3. The ends are coated with insulating material, as at $b$, Figs. 1 and 4. The cross-bars K, which alternate with the bars L, are in electrical connection with the longitudinal bar C on one side of the vessel, the cross-bars L, with the corresponding longitudinal bar, (not shown,) on the other side. The electrodes of one polarity therefore alternate with those of the other.

To make the electrical connection, the insulating material is removed from the bottom of the cross-bars, as shown, for the bar K in Fig. 4, so that they are in metallic contact with the proper bar. The insulating material is removed at one end only, that at the opposite end serving to prevent contact with the longitudinal bar, as shown for the bar L in Fig. 4. The electrodes are kept from contact with the lining and also from motion by longitudinal strips, M, of insulating material, (rubber or gutta-percha, for example,) which may be left loose or may be fastened to the sides of the vessel or to the cover. They are grooved to receive the edges of the electrodes, as shown in Fig. 2. The strips E may be and preferably are secured in position after the electrodes are in place; but it is evident that spaces could be left for the passage of the ends of cross-bars K L, so that any electrode could be hoisted out without removing the strips. The exterior connection with each of the longitudinal bars or conductors C is made by one or more metal screws, N, which pass through holes in the cover F and underlying strip E, and are tapped into the bar C, Figs. 1 and 4. These screws are of course suitably protected with insulating material. They need be inserted only in charging and discharging the battery, and may at other times be replaced by screw-plugs of insulating material to prevent accidental discharge. The exterior conductors may be connected with the screws N in any ordinary or suitable way. In the cover is a hole protected by a screw-plug, P. The battery liquid, electrolyte, or excitant may be introduced and removed through this hole, a pipe or hose being inserted when required. Above the lower or battery hold just described is the hold Q, for other freight or for passengers, or for both.

In the foregoing description the lower hold has been considered as extending the full length of the vessel or barge; but it is evident that it may be divided into compartments, and that one or more of these compartments may be used for batteries.

In Fig. 5 the division of vessels into compartments 1 to 5 is indicated in plan, the parallel lines representing the electrodes or elements. In Fig. 6 the sections 6 to 11 are built separately, and form separate floats, which, when united, make a complete barge. The float 9 is itself divided into three compartments. It is evident that the cells of battery can be connected in series, multiple arc, multiple series, and so on, like ordinary galvanic cells, according to the purposes to which they are to be applied. It is evident, also, that a float or combination of floats need not have the customary shape of a vessel, but may be of any desired shape.

Vehicles for land transportation can be fitted with storage-batteries in a substantially similar manner to what has been described. Thus in Fig. 7 the upper part, Q, of the car is reserved for freight or passengers, and the lower part, R, is made into the containing-vessel of a secondary battery. This may be substantially as described for the lower hold of the vessel; but it is preferred to give access to the interior from the side instead of from the top, so that access may be had to the battery without entering chamber Q or in any manner interfering with the freight in it. The side S of the battery-chamber is therefore made removable. It is shown removed in Fig. 8. The internal construction is shown in Figs. 9, 10, 11, and 12. The electrodes or battery-plates I are suspended from rods K L, of iron covered with lead $a$, except at the ends, which are enveloped in insulating material. These ends fit in holes in the walls of the chamber R, and the plates are thereby supported. The plates are kept away from the walls of the chamber by insulating-strips M', and are prevented from swinging by the insulating-strips M². These strips may be wholly or partly of insulating material. In Fig. 9 the strips have a wooden backing, $d$, and in Fig. 12 one of them has a wooden core, $e$. The connection of the electrodes or plates of the same polarity with one another and with the exterior circuit is made through the hooks T, of metal, protected from the action of the battery liquid or excitant. The rods K L rest in metallic contact with these hooks. The shanks of the hooks pass through the top of the battery-chamber and through perforations in metal strip W, let into said top, and are engaged each by a metal nut, U, which bears upon the metal connecting strip W below it. These parts are all protected by insulating material, a cap, X, of insulating material covering each nut U and the shank of each hook. There are two strips, W, and they are so arranged that each connects alternate hooks and the electrodes, as shown in Fig. 11. Connections of the strip with the exterior circuit may be made by ordinary or suitable means. As shown by the dotted conductors 13 in Fig. 7, they are connected with electrical couplers Y, of which a full description is given hereinafter.

The battery-chamber is filled and emptied through the holes $f\ g$ in the removable side S. Of course, holes in the top and bottom, as indicated in dotted lines at $h\ i$, Fig. 10, could be used instead. The battery-chamber R may be divided into as many compartments as may be desired by vertical partitions, such as indicated in dotted lines at 12, Fig. 7.

The extensible lead lining of Fig. 1, with the packing around it, is, for clearness, omitted in Figs. 9, 10, and 12; but it may be and would preferably be used. It is evident that secondary batteries in the shape of drawers Z, Fig. 13, could be run into the battery-chamber R, the side S being removed. They may also be run under the seats of passenger-cars, as illustrated in Fig. 14, so that they can be removed and replaced from the outside. The body of the cart shown in Fig. 15 has a lower battery-chamber, R, and an upper freight-box, Q. The interior construction is substantially as described with reference to Figs. 9, 10, 11, and 12. When the tail-board is let down, (the battery-liquid having been run out,) the hooks support the electrodes as they do those of the freight-car when the side S is removed.

The electric train, Fig. 16, consists of a locomotive, A', a tender, B', carrying a secondary battery, a short battery-car, C', and a longer one, D', and a passenger-car, E'.

On all the cars, R represents the secondary-battery chamber.

The locomotive is of any ordinary or suitable construction. As shown, it comprises a dynamo-electrical machine suspended below the floor and connected by belts with the driving-wheels. The secondary batteries carried by it give weight and traction power.

The tender and all the cars are connected by suitable conductors with the switch on the locomotive, so that one or more of the batteries carried by them may be drawn upon for electricity to run the train. The electrical couplers connect the conductors between the cars. Their construction is shown in Figs. 17, 18, and 19. Figs. 17 and 18 show, in face view, the couplers at opposite ends of the cars C' D' E'. They also represent the rear coupler of one car, and the front one of the next succeeding, the couplers on all the cars being alike. Fig. 19 shows two couplers connected. The blocks F' of insulating material are held together by spring-latches G', and are prevented from turning or from moving sidewise by the half-rims $k$ and the pins $l$, which overlap or fit into the opposite block, as shown. The conductors are electrically connected with the metal plungers $m$, through the metal sockets 50 at the base thereof. The plungers are combined with spiral compression-springs $p$, which, when the couplers are joined, press together the two opposite plungers, so as to connect the proper conductors in the two cars. The blocks F' are attached in the ends of flexible tubes H', which inclose the conductors. The number of these conductors may be greater or less, as may be necessary or desirable. As shown, there are six conductors, except on the tender B' and locomotive A', which have each eight conductors running to the couplers. The conductors and the corresponding plungers on each car are numbered 21, 22, 23, 24, 25, and 26. The additional ones on the tender and locomotive are numbered 27 and 28. The position of the plungers 27 and 28 is shown by the dotted circles in Figs. 17 and 18. The battery of the locomotive is connected with the conductors 29 and 30, Fig. 20, which do not lead to any coupler, and the battery of the tender to the conductors 27 and 28. The battery of each of the other cars is connected with the conductors 21 and 22 of that car.

With the exception of the tender B', which will always occupy a position next the locomotive, the cars have the conductors and couplers so arranged (see Fig. 20) that whatever their position in the train their respective batteries are, by the mere fastening of the couplers, connected with the locomotive each through independent conductors. In this way the conductors 21 23 25 of the locomotive are connected each with one pole (the positive pole, for example) of a separate battery, while the conductors 22, 24, and 26 are each connected with the opposite pole of the same battery. The conductors are also so arranged that the conductors 21 to 26 on the locomotive will always be connected with cars occupying the same position. Thus the battery of the car next the tender will always be connected with the conductors 21 and 22 of the locomotive, and it is immaterial whether it be the short car C', or the flat car D', or the passenger-car E'. The second car from the tender in like manner will always be connected, as shown in Fig. 20 for the car D', and the third car will have the connections of the passenger-car E'. It is also immaterial which end of the car is in front. If a fourth, fifth, or sixth car should be added, the batteries in each of them would be connected automatically in multiple arc with that of the first car, second and third car, respectively; but it would ordinarily be preferable to increase the number of conductors, so that each car would have an independent conductor to the locomotive. It is evident that they could be arranged, no matter how numerous, on the principle illustrated, so that the same car in order would always be connected with the same conductor on the locomotive, and it would be immaterial which end of the car is in front. The conductors on the tender are so arranged that whether it is or is not included, the other cars are connected with the same conductors of the locomotive, and in both the tender and locomotive the arrangement is such that it is immaterial which end is coupled to the cars.

Figure 21:
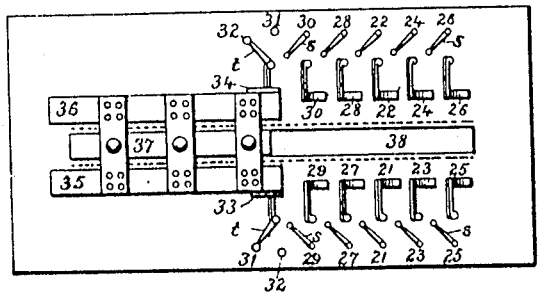
Figure 22:
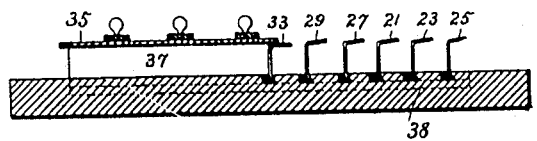
Figure 23:
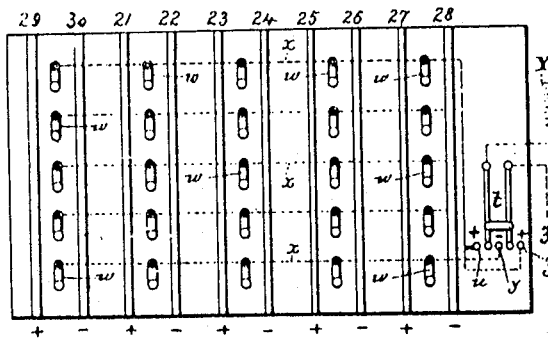

The switch shown in Figs. 21 and 22 consists of two series or rows of contact-springs, numbered to correspond with the conductors with which they are in connection. The connection is made through independent switches s, so that any of the contact-springs may be disconnected at will. Two contact-plates, 35 and 36, are carried by a slide, 37, being insulated from said slide and from each other. The slide moves in a dovetail or undercut groove, 38, in the base, which is of insulating material. The poles of the motor or dynamo for driving the locomotive are connected with the contact-plates 35 and 36, respectively, so that when the slide 37 is moved forward or back the motor will be included in or cut out of circuit with the batteries successively. The wires 31 and 32, leading from the respective poles of the motor or dynamo, are each divided into two branches, which terminate in contacts on opposite sides of the slide 37, as indicated in Fig. 21, the number 31 indicating the branches of one wire, the number 32 those of the other. Switch t serves to connect the branches with the contact-springs 33 and 34, through which the motor or dynamo is connected with the plates 35 and 36. In the position shown wire 31 is electrically connected with plate 35, the wire 32 with plate 36. By shifting the switches t the connection may be reversed. Thus the locomotive may be run in either direction. By this switch the batteries are connected in multiple arc; but it is evident that each battery may, by the use of a proper number of cells connected in series, have a high or low electro-motive force.

If it be desired to enable the engineer to connect the batteries either in series—multiple arc or multiple series—means such as shown in Fig. 23 may be adopted. The poles of each battery (one cell or a series of cells—as, for example, when the battery-chambers are divided into compartments)—terminate in the vertical strips, numbered to correspond with the conductors connected therewith. Switch-levers w, arranged in vertical rows between each pair of strips, and connected in horizontal rows by the cross-wires x, serve to connect the batteries with one another and with the contacts x y z in whatever arrangement may be desired. The motor-wires 31 and 32 are connected with the switch-levers t. In the position shown they have no connection with the batteries. By turning to the left the left lever is connected, through w, with the top cross-wire, and the right lever, through y, with the bottom wire, x. By turning in the opposite direction the right-hand lever t connects with the top wire, x, through z, and the left-hand one with the bottom wire through y. Thus the current through the motor or dynamo may be reversed at will.

Figure 24:
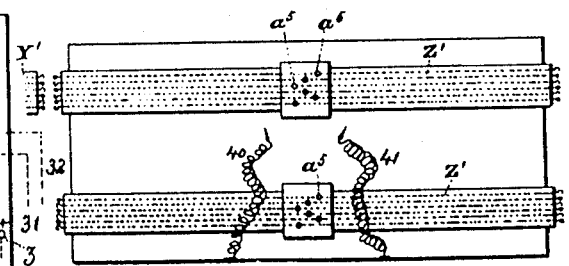

In Fig. 24 a series of bands, Z', (two are shown,) of insulating material having conducting wires embedded therein, are secured along the bottom of each car, and each wire is connected with a binding-post, a'. The terminals 10 and 11 of the battery of the car can be connected with any pair of wires by means of the binding-posts. The wires have each a hook at one end of the car and an eye at the other, and the hooks and eyes are so arranged that the order is the same whichever end of the car is in front. The bands on adjacent cars may be directly connected, or a short-coupling strip, Y', may be used between the cars.

It is evident that the stored electricity can be used for any desired purpose.

The vehicles may be moved by steam or other power independent of the batteries instead of by the stored power, as described, or this power may be used for lighting. Thus a battery-car can be attached to an ordinary train for lighting and other purposes.

It is evident that the barges such as hereinbefore described could be made to supply the tug which draws them with power by means similar to those described for a railway-train, or they may be individually propelled by the stored electricity.

The construction and arrangement of the electrodes shown and described are set forth by way of example only, the invention not being limited strictly thereto, since it is obvious that the electrodes and their arrangement may be of any ordinary construction. It is contemplated to embed the electrodes in porous material, as described in Patent No. 266,262, granted to William A. Shaw and myself October 17, 1882, whenever found necessary or desirable.

Many changes and modifications could be made without departing from the spirit of the invention. The lead lining is corrugated or crimped, so as to render it extensible and not liable to be broken by strains put upon the vehicle.

The cars, boats, or other vehicles may be built of wood or iron.

Having now fully described my said invention and the manner of carrying the same into effect, what I claim is—

1. A secondary battery built into a vehicle, and provided with a corrugated or extensible lining to the containing-vessel, substantially as described.

2. A vehicle having a secondary battery built therein, the battery-chamber being accessible through the side or end of the vehicle, substantially as described.

3. A railway-car carrying one or more secondary batteries arranged under the seats or floor, and being provided with one or more openings in the side, whereby said batteries are made accessible from the outside at the side of the vehicle, substantially as described.

4. In an electric train, the combination of the conductors and couplers, substantially as described, each car or vehicle having a series of conductors extending from end to end of the same, and terminating in the contact-makers of the couplers, part of said conductors being connected with the electrical apparatus or battery in that car or vehicle, and part being disconnected therefrom, and the said couplers, when adjacent cars are electrically coupled thereby, connecting the disconnected or through conductors of one car with those conductors in the adjacent car which are connected in the latter with the electrical apparatus or battery carried thereby, whereby each car or vehicle is, by the mere act of coupling, connected with independent conductors running through the train and terminating in a common car or vehicle, such as the locomotive, and serving to conduct the electricity between said common car or vehicle and each of the cars individually, substantially as described.

5. An electric locomotive and a train of vehicles or cars drawn thereby, having each a secondary battery built in the vehicle, in combination with conductors and couplers constructed, arranged, and connected, as explained, so that the mere act of coupling establishes an independent circuit or branch between the locomotive and the several cars, and switch mechanism for diverting the currents from the secondary batteries into the motor or engine of the locomotive, substantially as described.

6. A series of vehicles coupled as a train, and including an electric locomotive for drawing the same, the cars of said train carrying secondary batteries, the locomotive carrying a switch for controlling the supply of electricity to the driving-motor, and conductors with couplers between the vehicles being provided for separately connecting the batteries with the aforesaid switch, substantially as described.

7. A vehicle having a secondary battery built therein, and provided with a side or end opening into the battery-chamber, the said chamber forming the containing-vessel of the battery, and being provided with conducting and supporting means for supporting the elements in said chamber and connecting them with terminal conductors, and for permitting the removal of the same through said side or end opening, substantially as described.

8. A combined vehicle and secondary battery for transportation of passengers or freight as well as stored electric energy, the said vehicle containing, in addition to the passenger or freight space, one or more battery-chambers built into said vehicle so as to form a permanent part thereof, and being provided with the battery-plates and the conductors, the said chambers constituting the containing-vessels of the secondary battery, and being provided with removable doors or hatches closing liquid-tight, said battery-plates being removably supported in said chambers and being held from independent motion, and said conductors which are connected with said plates being protected from the exciting-liquid and being arranged so as to be out of the way of the passengers or freight, substantially as described.

In testimony whereof I have signed this specification in the presence of two subscribing witnesses.

LEBBEUS H. ROGERS.

Witnesses:
H. D. ROGERS,
W. R. BIDDLE.